Figure 1:
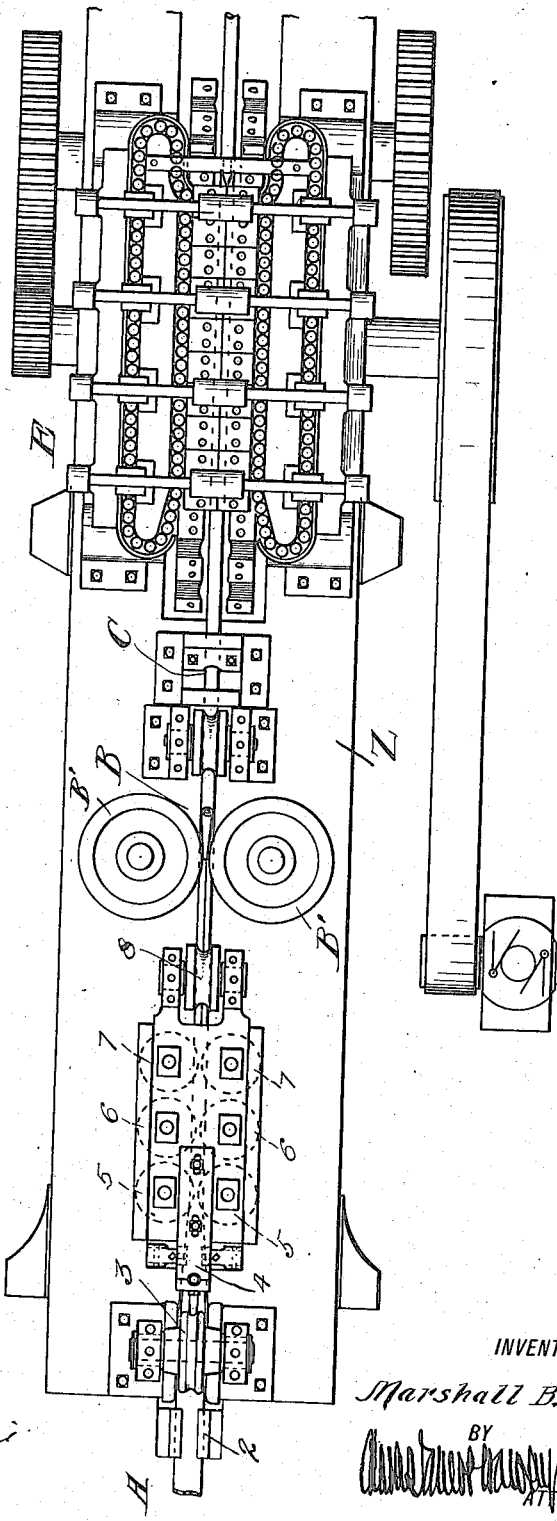

M. B. LLOYD.
ART OF MANUFACTURING TUBING.
APPLICATION FILED AUG. 7, 1912.

1,141,066.

Patented May 25, 1915.
6 SHEETS—SHEET 1.

WITNESSES:

INVENTOR:
Marshall B. Lloyd.
BY
ATTORNEY

M. B. LLOYD.
ART OF MANUFACTURING TUBING.
APPLICATION FILED AUG. 7, 1912.

1,141,066.

Patented May 25, 1915.
6 SHEETS—SHEET 3.

WITNESSES:

INVENTOR:
Marshall B. Lloyd.
BY
ATTORNEY

M. B. LLOYD.
ART OF MANUFACTURING TUBING.
APPLICATION FILED AUG. 7, 1912.

1,141,066.

Patented May 25, 1915.
6 SHEETS—SHEET 4.

WITNESSES:
Arthur W Nelson
Robert S. McEadie

INVENTOR:
Marshall B. Lloyd
BY
ATTORNEY.

M. B. LLOYD.
ART OF MANUFACTURING TUBING.
APPLICATION FILED AUG. 7, 1912.
1,141,066.
Patented May 25, 1915.
6 SHEETS—SHEET 5.
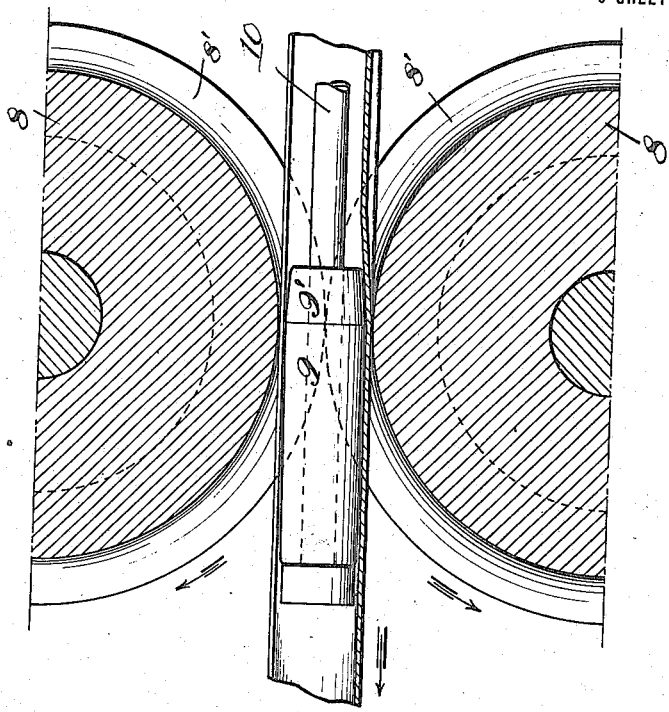
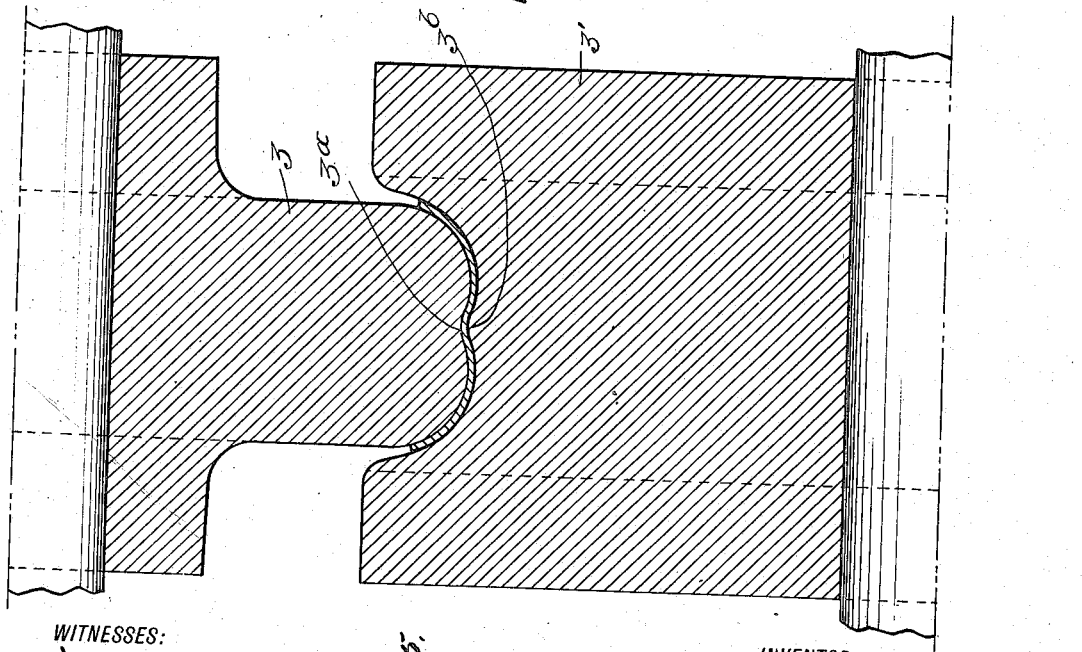
WITNESSES:
Arthur W Nelson
Robert S McCreadie
INVENTOR:
Marshall B. Lloyd.
BY
ATTORNEY.

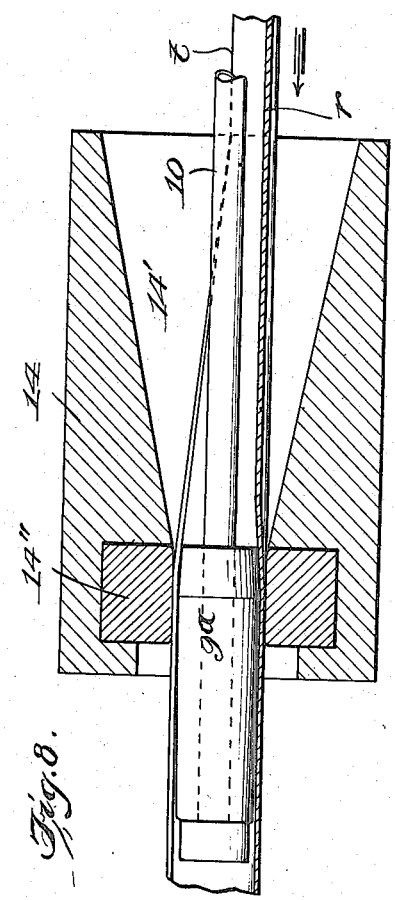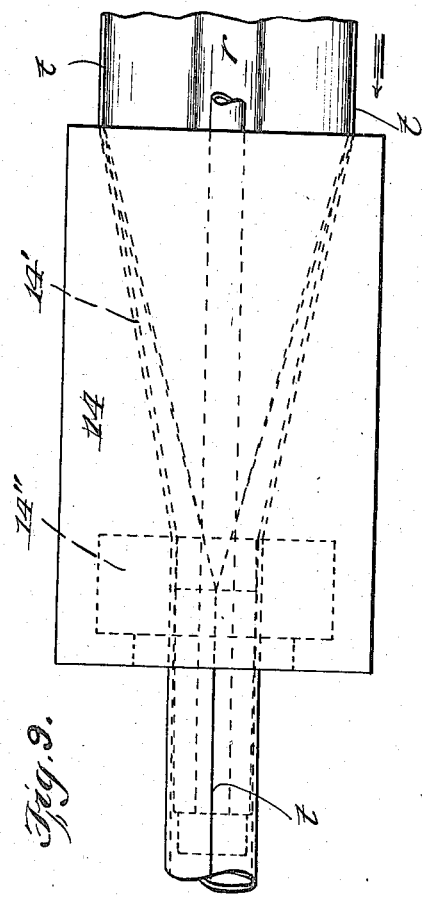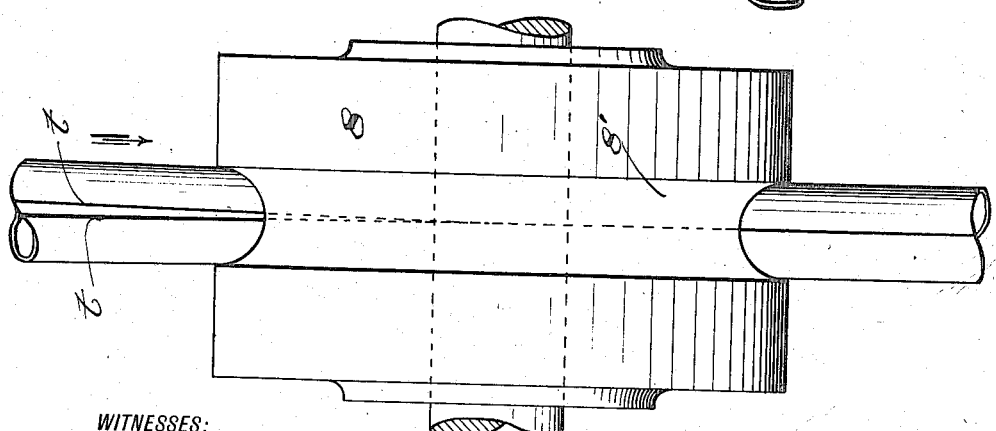

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

ART OF MANUFACTURING TUBING.

1,141,066.  Specification of Letters Patent.  Patented May 25, 1915.

Application filed August 7, 1912.  Serial No. 713,850.

*To all whom it may concern:*

Be it known that I, MARSHALL B. LLOYD, a citizen of the United States, and a resident of Menominee, in the county of Menominee and State of Michigan, have invented certain new and useful Improvements in the Art of Manufacturing Tubing, of which the following is a specification.

My invention relates to improvements in the art of manufacturing longitudinally seamed tubing from strip metal stock. When such stock is rolled into tubing having a longitudinal seam and when it is drawn through forming dies that do not thin the stock, the seam gapes open after the tubing is discharged from the rolls or dies. I find that the cause of this gaping or opening of the seam lies in the resiliency of the metal. Though the metal may be bent and pressed with great firmness, it nevertheless is not deprived of resilience. Thus, it transpires that while the same edges may be very tightly pressed together in the rolls or die, even to the point of somewhat upsetting the metal, still when released from the rolls or dies, the seam will spring open, and the seam edges, instead of being in close contact, will be found separated by a considerable crack.

According to known methods, any pressure, pull or strain, which, as when the metal is thinned, fails to displace and re-assemble the molecules of the stock, falls short of leaving the seam edges in close contact when discharged from the limiting rolls or dies. Obviously, forces which will cause the rearrangement of the molecules of the metal, can only be effected by powerful machinery and at relatively high cost.

The purpose of my invention is to accomplish the effects ordinarily producible only by powerful machinery and much labor, with less expenditure of power and at less cost, and, preferably, without thinning the stock, and to the end that metal tubing having a tightly closed butt seam and of maximum diameter and of substantially the same thickness as the original stock, may be manufactured at practically the same cost as common open seamed tubing. I attain these objects by shaping a piece of strip stock into a tube having an open longitudinal butt seam and also having a longitudinal bead; and, by then passing such tube through mechanism, such as rotary or stationary dies, which forces the metal constituting the bead into conformity with the perimetrical remainder of the tube; that is, I force the bead within the boundaries defined by the ultimate normal inner and outer perimeters of the tube. By so doing I produce tubing which instead of being resilient in an outward direction is either inert or positively resilient in an inward direction; that is to say, I cause a reversal of the initial resilience. The degree of reversal is determined by the dimensions and shape of the longitudinal bead and as indicated may be only sufficient to produce inertness or may be such as to cause the abutted seam edges to press together with the force and positiveness necessary to maintain the edges in close contact during flame welding or brazing.

My invention will be more clearly understood by reference to the accompanying drawings forming part of this specification, and in which I have illustrated my process as carried out in and by the aid of a mechanism which I find best suited thereto.

Figure 2:
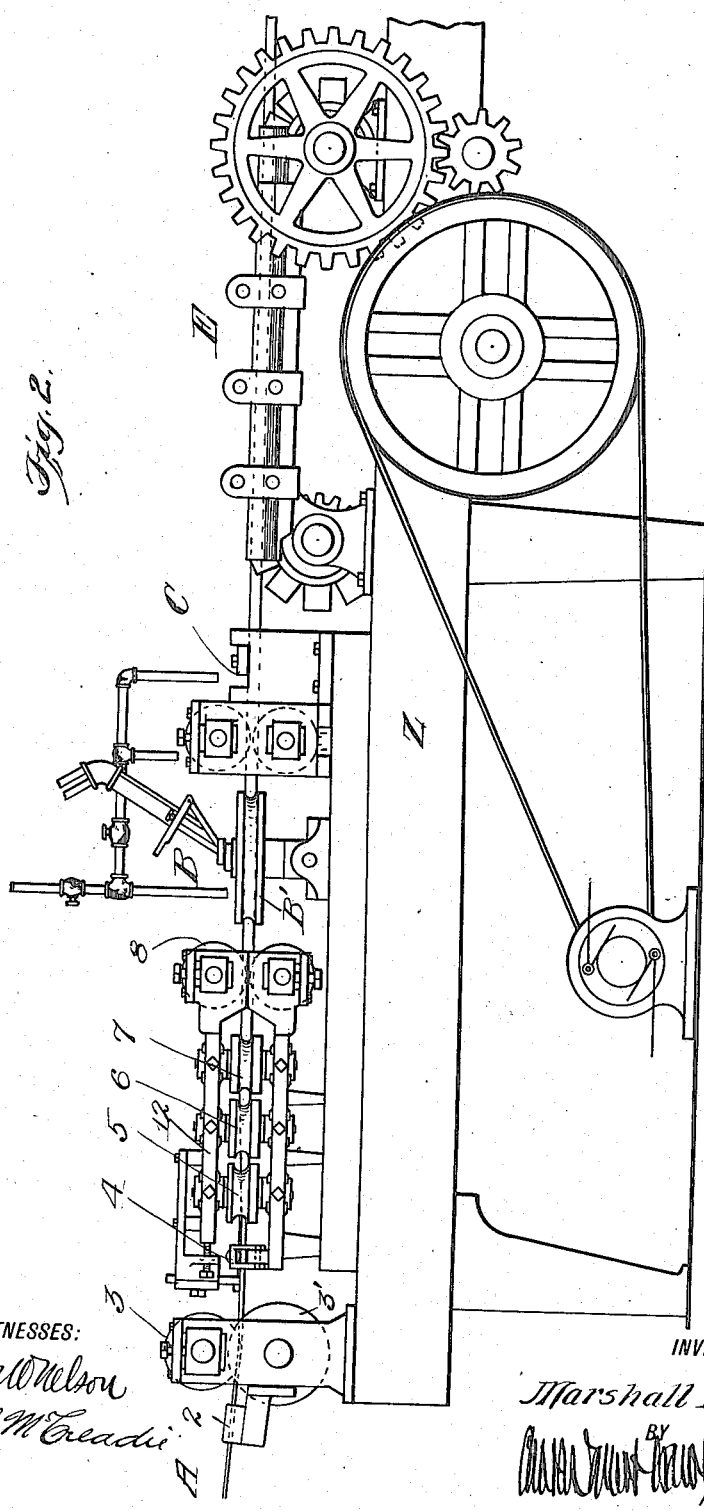
Figure 3:
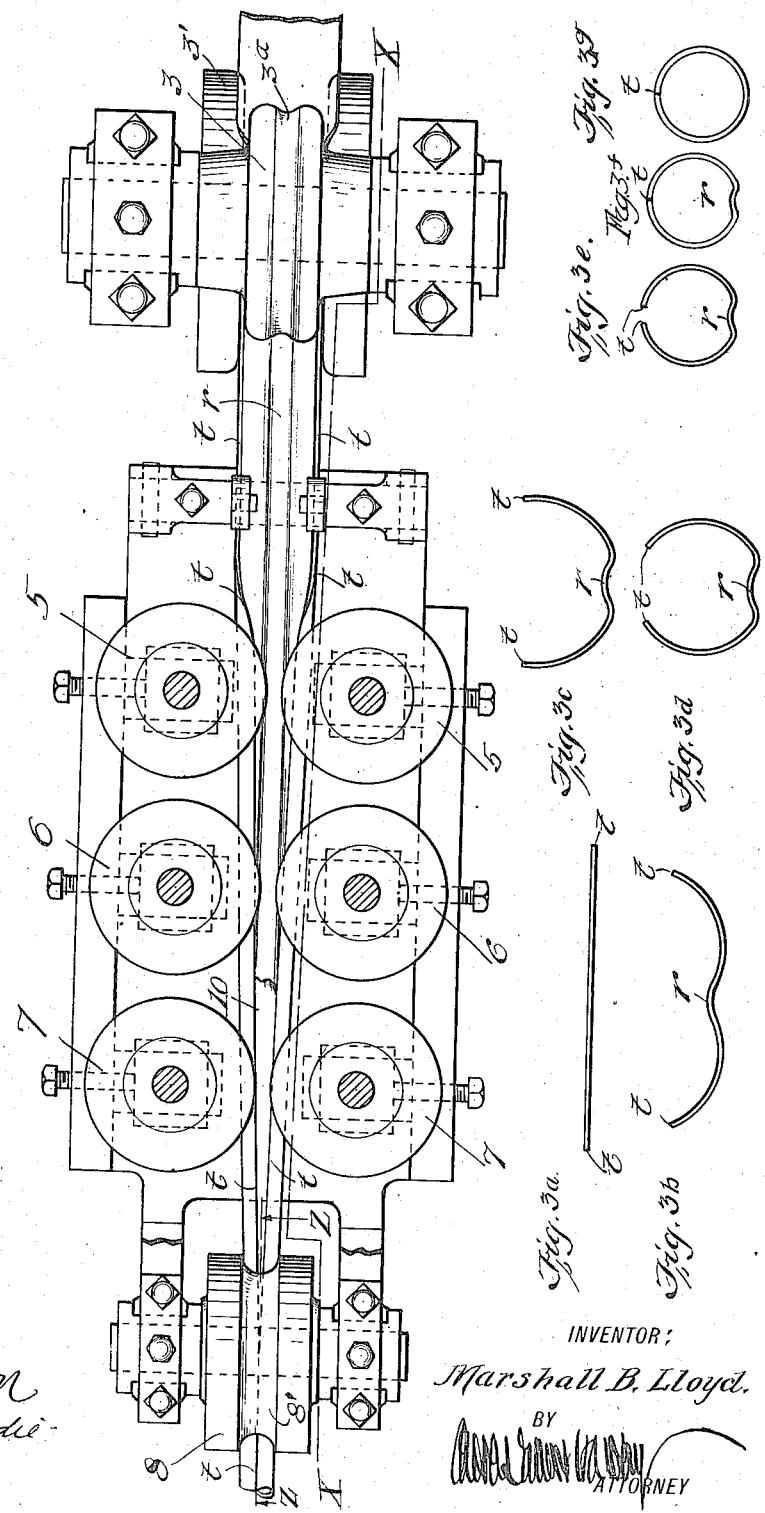
Figure 4:
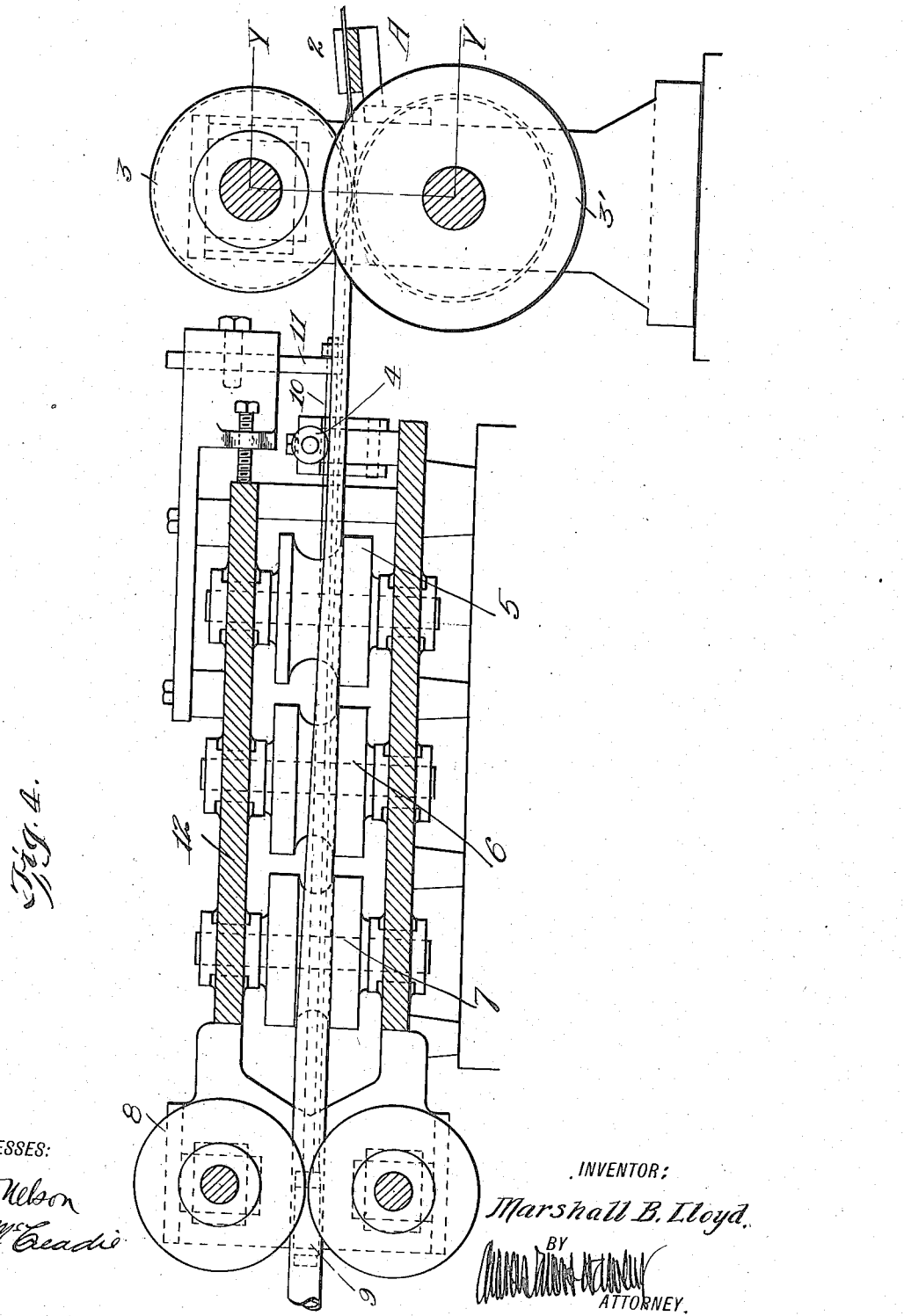

Figure 1, is a plan view of the mechanism. Fig. 2, is a side view thereof. Fig. 3, is an enlarged plan view of the several forming rolls that I prefer to use. Figs. $3^a$, $3^b$, $3^c$, $3^d$, $3^e$, $3^f$, and $3^g$, are cross sectional views, illustrating the evolution or development of a butt seamed tube from strip stock. Fig. 4, is a vertical longitudinal sectional view, on the irregular section line X—X of Fig. 3. Fig. 5, is an enlarged section of the first rolls, on the line Y—Y of Fig. 4. Fig. 6, is an enlarged section of the last or finishing rolls or dies, on the line Z—Z of Fig. 3, showing the inside mandrel. Fig. 7, is a plan view of the parts appearing in Fig. 6. Fig. 8, is a longitudinal sectional view of a piece of tubing in formation, passing through a stationary die, instead of between a die formed by rolls. Fig. 9, is a plan view thereof.

As before intimated the mechanism shown in the drawings is that which I have devised as the best means of carrying out the herein described process of manufacturing closed butt seamed tubing. By means thereof I am able to overcome, destroy or reverse the natural resilience of the metal to such extent as to secure any desired closeness and pressure between the seam edges.

It is to be clearly understood that my invention is not limited to the specific mechanism herein shown and described but may be carried out with tools of many other forms and kinds.

This present invention is particularly advantageous in the manufacture of welded and brazed tubing, in which cases it is very desirable that the seam edges shall be in close contact at the moments when heat is applied thereto.

In practice I employ the novel steps herein set forth, by way of addition to the process described and claimed in Letters Patent No. 1,027,864, granted May 28, 1912, and the machine or apparatus intended to be shown herein is like unto the machine shown in said patent and in Patent No. 1,027,865 of the same date, except in particulars incident to this present invention. On comparing the drawings herein with those in the patent referred to, it will be apparent that in this case I have not concerned myself in a showing of the measuring and cutting off mechanisms, requisite to a continuous process.

In the present drawings the bench or table is indicated by the letter, Z; the continuous vise or draw bench is indicated by the letter, E; the knife which removes the bur from welded tubing is indicated by the letter, C; and, the welding mechanism is indicated by the letter, B. The office of the continuous vise is to grasp the tubing and draw the stock forward at a constant rate of speed. In practice the vise also projects the finished tubing forward into the measuring and cut off mechanism, not shown. The office of the welding mechanism is to unite the seam edges of the tubing which is prepared in the manner about to be described.

I make use of either hot rolled or cold rolled strip metal stock, and will now describe the operation by which this stock is formed into tightly closed butt seamed tubing, before it reaches the welding mechanism. The stock held in the continuous vise is in the form of tubing and may be readily traced back to the point A where it is still in its normal or initial flat condition. The flat strip stock enters the machine through a guide 2 and thence passes through the initial forming rolls 3, 3'. It then passes a positioning device 4, which is not essential in the present process. It is then received by variously grooved pairs of rolls 5, 6 and 7, preferably disposed in a horizontal plane, and is finally closed by a pair of rolls 8, 8, preferably disposed in a vertical plane, adjacent to the holding rolls B' of the welding mechanism, if such mechanism is used. The roll 3 is generally convex but is provided with a middle groove 3$^a$. The roll 3' is concave, but is provided with a complementary middle rib or circumferential convexity 3$^b$. As the flat strip stock is drawn through these rolls it is bent to substantially the form shown in Figs. 3$^b$ and 5. The stock thus partially formed, on entering between the rolls 5, 5, is further bent, to substantially the form shown in Fig. 3$^c$. In passing the rolls 6, 6 the stock takes on the form shown in Fig. 3$^d$; and the rolls 7, 7 deliver the stock in the cross sectional form disclosed in Fig. 3$^e$. It will be observed a tube which is not fully circular is formed by the rolls 3, 5, 6 and 7. Furthermore the tube on leaving the rolls 7 has its edges $t, t$ rather widely separated. The irregularity of the section is due to the middle bead $r$ which is preserved throughout the operations thus far detailed. Obviously this bead extends longitudinally and results from the action of the first pair of rolls 3, 3'. The rolls 8, 8, best shown in Figs. 3, 6 and 7, contain grooves 8', 8', which are semi-circular in cross section and together they present a roll or die opening of circular form and of the diameter of the tube to be formed. The circumference of the opening between the rolls 8, 8, formed by the grooves therein, is slightly, if any, less than the width of the strip stock at the point A.

It will be clear that the stock which leaves the rolls 7, 7 in the condition depicted in Fig. 3$^e$, will enter and substantially fill the opening provided by the rolls 8, 8, and in so doing will assume the appearance indicated in Fig. 3$^f$. The bead $r$, is preserved substantially intact until this moment, but on entering the rolls 8, 8, the bead is opposed by a mandrel 9, having a conical receiving end 9', as shown in Fig. 6. This mandrel is held in place by a tension rod 10, attached to a bracket 11, which overhangs the receiving end of the frame, 12, belonging to the rolls, 5, 6, and 7. The mandrel and the rolls together limit the passage for the stock to mere annular space substantially co-extensive with the cross section of the stock. As the stock is drawn through the same, the bead, $r$, is necessarily obliterated; that is, the reserve metal constituting the bead is forced into conformity with the circumferential or perimetrical remainder of the tube, or in other words, is forced within the boundaries defined by the ultimate normal inner and outer perimeters of the finished tube. The stock or tube on emerging from the rolls 8 and mandrel 9 is of the true circular or other predetermined form of the passage defined by said rolls and mandrel. By thus first forming the bead in the tube stock and by forcibly displacing and obliterating the bead, I successfully drive the edges, $t$, into close contact, which contact is preserved after the tube is drawn forward beyond the restraint of the rolls 8. There is an actual reversal of the actual resilience of the metal and the degree or strength of the reversal and the inward resilience may be varied by variously forming the bead $r$. There are two ways in which this reversal of resilience may be accounted for; first the forcible displacement of the bead $r$ in an outward direction, throws the opposite sides of the tube inwardly, due to the spring of the metal adjacent to the bead; and, second, the forcible displacement of the metal composing the bead occurs at an instant when the die opening, formed by the rolls and mandrel, is substantially filled with metal, in consequence of which the swaging in or addition of the metal composing the bead has the effect of driving the remainder of the metal circumferentially within the die opening, giving the metal a permanent set which holds its edges $t$ in firm abutment.

At times I substitute for the rolls 5, 6, 7, and 8, a single conical die 14 and mandrel $9^a$, which perform the same functions. Such die is shown in Figs. 8 and 9, wherein the receiving portion of the die is shown to present a conical throat $14'$, terminating in a minimum dimension portion or die proper $14''$.

Having thus described my invention, I claim as new and desire to secure by Letters Patent:—

1. The improvement in the art of manufacturing inwardly resilient butt seam tubing, that consists in shaping a piece of strip metal into a tube having a substantially closed longitudinal butt seam, and a small inwardly disposed longitudinal bead, and then performing upon the tube acts which force the metal of the bead within the inner and outer perimeters of the tube, thereby producing a tube of maximum diameter and of substantially the same thickness as the initial stock and having the seam edges thereof in firm contact.

2. The herein described process of making metal tubing having a tightly closed longitudinal butt seam, which consists in performing acts upon strip metal which shape it into a tube very nearly approaching the ultimate form desired but having a somewhat open seam and which also form a relatively small longitudinal, inbent bead in the tubing and finally acting upon the bead portion to obliterate it and firmly close the seam.

3. The herein described process of making metal tubing having a tightly closed longitudinal butt seam, which consists in performing acts upon strip metal which shape it into a tube, very nearly approaching the ultimate form desired but having a somewhat open seam and which also form a relatively small longitudinal, inbent bead portion diametrically opposite to the seam, and finally acting upon the bead portion to force same into the continued outline of the remainder of the tube and thereby tightly closing the seam.

In testimony whereof, I have hereunto set my hand this 26th day of July, 1912, in the presence of two subscribing witnesses.

MARSHALL BURNS LLOYD.

Witnesses:
F. E. LLOYD,
HILDA C. PETERSON.